United States Patent [19]
Klemm

[11] 4,118,659
[45] Oct. 3, 1978

[54] ELECTRIC MOTOR FOR PHOTOGRAPHIC CAMERAS

[75] Inventor: Reinhart Klemm, Zurich, Switzerland

[73] Assignee: Ernst Leitz Wetzlar GmbH, Wetzlar, Fed. Rep. of Germany

[21] Appl. No.: 763,989

[22] Filed: Jan. 31, 1977

[30] Foreign Application Priority Data
Feb. 19, 1976 [DE] Fed. Rep. of Germany ....... 2606677

[51] Int. Cl.² .............................................. G03B 1/18
[52] U.S. Cl. .................................. 318/560; 310/116; 354/173
[58] Field of Search ...................... 310/116, 115, 118; 354/173; 318/560

[56] References Cited
U.S. PATENT DOCUMENTS

| 2,320,306 | 5/1943 | Rumbaugh | 310/116 X |
| 3,999,197 | 12/1976 | Iwashita et al. | 354/173 |

Primary Examiner—Herman J. Hohauser
Attorney, Agent, or Firm—Gilbert L. Wells

[57] ABSTRACT

An electric motor attachable to a photographic camera for shutter rewind and film transport. The output shaft of the motor acts on the main shaft of the camera and has no further operational connection with the camera shutter. The electric motor (8) proper is rotatably supported in the housing (7) so that the stator of the motor rotates oppositely to the direction of rotation of the rotor when the rotor is locked into position at the end of the shutter rewind and film transport. A switch for the motor circuit is actuated by the backward moving stator.

7 Claims, 7 Drawing Figures

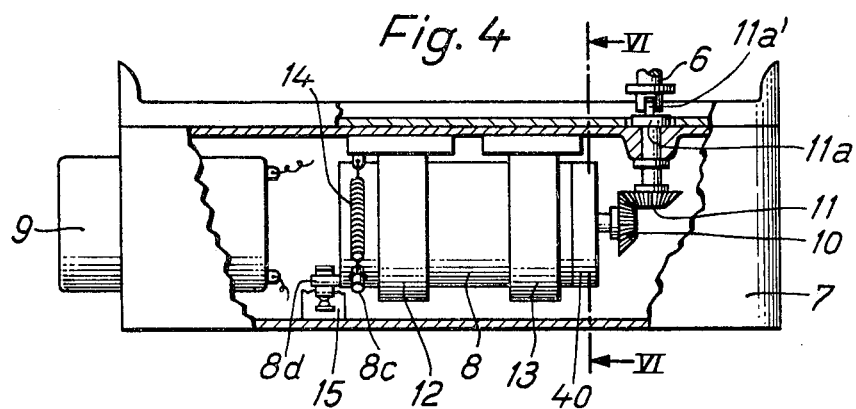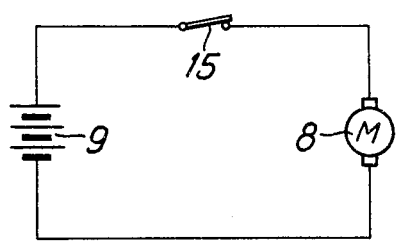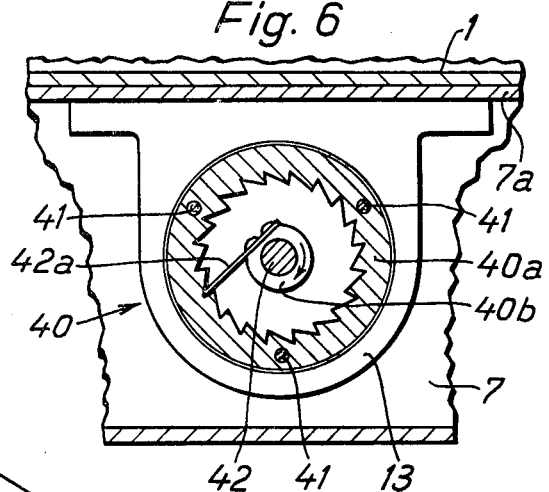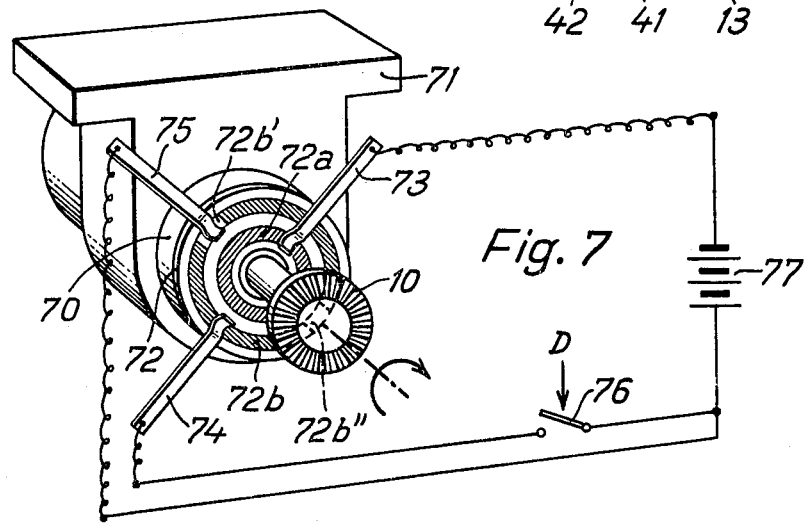

4,118,659

ELECTRIC MOTOR FOR PHOTOGRAPHIC CAMERAS

CROSS-REFERENCE TO A RELATED APPLICATION

Applicant claims priority under 35 USC 119 for application P 26 06 677.3-51 filed Feb. 19, 1976 in the Patent Office of the Federal Republic of Germany.

BACKGROUND OF THE INVENTION

The field of the invention is electric motors for photographic cameras and the present invention is particularly related to an attachable electric motor for photographic cameras which drives the shutter and the film transport.

Attachable motors for use in photographic cameras are known in many embodiments. Two large groups may be distinguished. The first is one in which the motor is functionally connected with the camera shutter so that prior to the end of the shutter motion the shutter emits a signal to the motor to control the motor's action. This certainly requires an electric connection between the camera and the attached motor in the form of electrical contacts. Beside the costliness of such motors, these connecting contacts form a constant—at least a potential—source of malfunction because they are always exposed to the danger of oxidation. Furthermore, the camera and the motor require a common design so as to ensure that the contacts will match. This means that existing cameras ordinarily cannot be retro-fitted with such motors.

In the second group of attachable motors, there is no such connection between the camera shutter and the motor. Most of the time such motors are of simple design and are characterized further by their typically easy adaptation to extant cameras. No more is required to that end than making a connection at the bottom of the camera between the motor output shaft and that shaft of the camera which ordinarily is actuated by the film-transport and shutter rewind lever. This connection may be a simple mechanical plug-in connection which merely ensures that the manual force otherwise transmitted from the camera rewind lever to the shaft is now transmitted from the motor to the shaft.

However, this second group of embodiments suffers from a significant drawback. Because of the lack of functional connection between the camera shutter and the motor, the motor also fails to receive a signal from the shutter when the end of the shutter sequence has come and when the time comes for the motor to begin winding up the shutter and transporting the film. The possibility of manufacturing a camera motor in simple and economical manner allowing adaptation to extant cameras is balanced in the second group of embodiments against accepting the drawback of making the motor run according to a virtually frozen plan at a time previously frozen by design and following the shutter release. Thus as regards a known motor previously used in practice, the design required that 1/30 of a second following shutter release, the motor began winding up the shutter again and transporting the film. This means that the motor satisfactorily operates only within the shorter time interval, that is for instance between 1/1000 and 1/30 of a second in which the shutter had already gone through its sequence by the time the motor started running. But if the selected exposure exceeded 1/30 of a second, the motor begins running before the shutter has gone through its cycle. This leads to gear jamming and frequently to damage to the motor.

In any event, significant repairs were required to make the motor operational again. Attempts were made to eliminate such malfunctions by expressly stating in the instructions for use that no exposure times exceeding 1/30 of a second were to be used if the motor were attached.

Quite aside from the circumstance that there always were users attempting to photograph at longer exposures in spite of the instructions and hence were jamming the motor drives, it was naturally unsatisfactory that the motor would not allow photographing at longer exposures than 1/30 of a second.

SUMMARY OF THE INVENTION

Having in mind the limitations of the prior art it is an object of the present invention to create a simple, attachable motor without functional or operational connection between it and the camera shutter which is easily adaptable to extant cameras and overcomes the drawbacks of known motors of this kind and allows especially longer exposure times.

This object is achieved by a particular motor which is rotatably supported in its own housing so that the stator of the motor rotates in the direction opposite to that of the rotor after the rotor upon termination of the motion of the shutter and of the film transport is blocked in its own rotation by means of a motor-circuit switch actuated by the reverse-rotating stator.

Various tangible basic embodiments are possible using a motor so mounted and actuating such a switch.

Everyone of these basic embodiments overcomes the frozen association of motor start and shutter-release, for instance the (fixed) starts taking place 1/30 of a second after the release. Arbitrarily long exposures may be used without there being malfunctions.

In a first embodiment, for instance, the motor is connected on one side by means of the contact of a relay and on the other side by the off-contact of a switch to a battery. The on-contact of this switch then allows connecting the self-latching relay to the battery, the switch in turn being actuated by the camera (shutter) release or by a part moved by same. The switch actuated by the reverse-rotating stator is located between the relay and the battery, a spring being connected to the stator to pull it back into its initial position after the current has been interrupted.

This first embodiment provides reliable operation of relay and switch, but is relatively expensive. The motor always operates flawlessly as long as the camera release is kept depressed for all of the exposure time and so long as it is not released until after the shutter has run its course. This condition presents no problem so long as the exposure times are short enough to make it physically impossible for the user to take his finger off the release before the shutter has run its course. This means times from the shortest exposure to about 1/60 or even 1/30 of a second.

Obviously the user is in a position to remove his finger from the release for the longer exposures, especially for durations of ½ or 1 seconds, even though the shutter would not yet have run its course. Instructions for this first embodiment therefore must caution the user that the release must be kept depressed until the shutter has completed its cycle.

Because of the simplicity of design—no (permanent) connection is required between shutter and motor—and hence because of the economy in manufacture, the user must heed certain operational rules both as regards the motors of the state of the art and the one of the present invention. The decisive factor however is in the penalties exacted if the user disregards these rules. If pictures are taken for an exposure exceeding 1/30 of a second with the motor of the state of the art and in violation of the operational rules, jamming will result which can only be remedied in the repair shop. But if the user violates the rule with the motor of the present invention, and takes his finger off the release before the shutter has completed its full cycle, no other harm will occur than the motor staying more or less inoperatively and the user being required to re-initiate the release by another depression upon completion of the shutter cycle. The mechanism is explained further below. In any event, it is clear that the motor of the present invention is far superior to those of the state of the art also in this respect.

A second embodiment eliminates the relay and the switch. An OFF contact is located in the circuit between the battery and the motor and acts as a switch actuated by the reverse-rotating, spring-loaded stator. Stopping means furthermore are provided which rigidly couple the stator at the end of its reverse rotation to the rotor, so that the rotor holds the stator in its final position, so long as the rotor is locked in its forward rotation by the rewind shaft of the camera. Only when the locking by means of the rewind shaft is eliminated at the end of the shutter cycle is the spring capable of rotating both stator and rotor in common in the forward direction, thereby closing again the OFF contact and starting the motor. Therefore this embodiment lacks any connection between the camera and the motor except between the motor drive and the camera rewind shaft.

A third embodiment also omits relay and switch and activates simultaneously the motor and the shutter release. Care is taken however, that the stator rotates reversely during the shutter cycle. Two annular (conducting) paths are rigidly connected with the stator in this embodiment. One path permanently connects the motor to the battery, the other path comprises two interruptions and is in contact with two wipers going to the battery through two parallel branches, one branch being equipped with an operational contact activated by the camera release. The contact and the interruptions in the circuit interact in a manner described below.

BRIEF DESCRIPTION OF THE DRAWINGS

The present invention is shown in the appended drawings by means of three embodiments, wherein:

FIG. 4 is a schematic view of the camera motor in a second embodiment;

FIG. 5 is a circuit diagram of the motor in a second embodiment;

FIG. 6 is a section through FIG. 4 along line VI—VI; and

FIG. 7 is a schematic view of the camera motor in a third embodiment.

DESCRIPTION OF THE PREFERRED EMBODIMENTS

Figure 1:
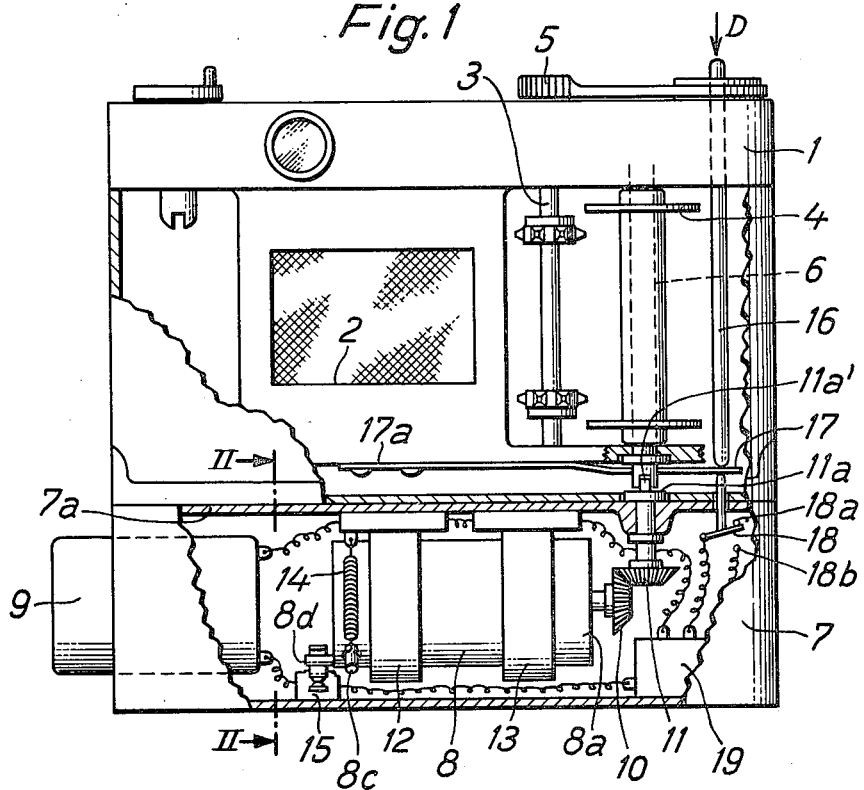
FIG. 1 is a diagrammatic view of a camera with attached motor of a first embodiment, shown partly in section.

FIG. 1 shows photographic camera 1 from the rear, the rear cover having been mostly removed, allowing a view of image frame 2 and also film-transport roller 3 and wind-up roller 4.

The camera further is provided with a rapid-wind lever 5 for the common film-transport roller 3.

As regards operation of the camera and of main shaft 6, it is immaterial whether the main shaft is driven from above by the rapid-wind lever 5 or directly from below at the shaft itself. This circumstance is made use of in known manner for the motor drive. A housing 7 is attached to the bottom of camera 1. The kind of fastening used is arbitrary and therefore not demonstrated further. The most essential component of the housing is the electric motor 8 fed by a battery 9. Motor 8 is provided at its front 8a with a reduction gear not shown in further detail, the drive however consisting of a shaft with beveled gear 10.

Bevel gear 10 meshes with another bevel gear 11 supported in housing wall 7a and projecting outward by means of a shaft stump 11a. A rectangular bulge 11a (sprint) is mounted on the shaft stump and engages a groove at the lower end of main shaft 6. This engagement is the only operational connection required between the motor and the camera. It is easily noted that no difficulties are created in post-adapting the motor to extant cameras. It is necessary only to machine the groove into the end of main shaft 6 or to exchange the extant main shaft lacking a groove with a main shaft with groove.

The motor is supported by two braces 12, 13 so as to be capable of rotation. The motor comprises a first pin 8b which may rotate in a clearance 12a of brace 12, and which limits the motor's amount of rotation. The motor furthermore comprises a second pin 8c engaged by tension spring 14 which tends to make the motor rotate counter-clockwise and which keeps the motor, together with pin 8b, pressed against the lower left-hand corner of clearance 12a.

A further pin 8d is fastened to the motor to operate jointly with a switch 15 which is discussed further below.

Camera 1 comprises a release rod 16 extending vertically through the camera housing and resting on the biased end of a leaf-spring 17 mounted at 17a to the lower housing wall of the camera. The leaf-spring is depressed upon every shutter release and in turn pushes the release rod 16 upward whenever the user takes his finger off the release.

The leaf-spring actuates a switch 18 of which the contact is moved from OFF 18a to ON 18b. This switch is shown as a microswitch 18 in FIG. 1.

Figure 3:
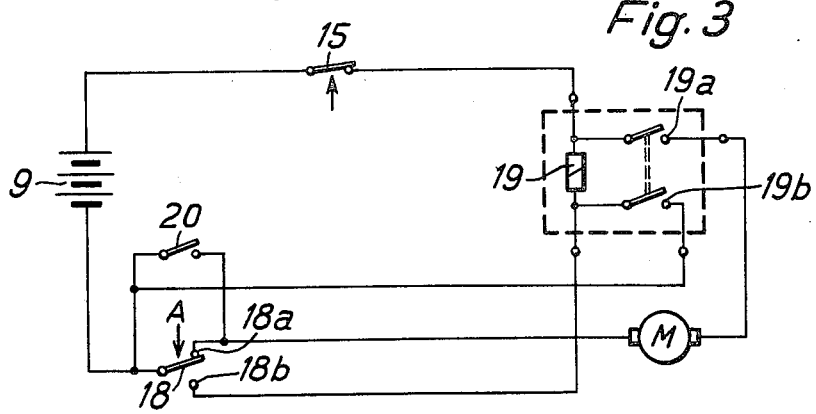
FIG. 3 is a circuit diagram of the motor in a first embodiment.

Motor housing 8 further comprises a relay 19 with two contacts 19a and 19b (FIG. 3). Contact 19a applies potential to the motor, and 19b is self-latching.

Figure 2:
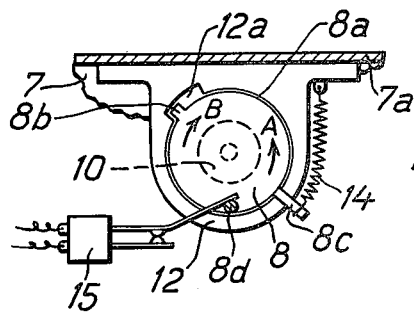
FIG. 2 is a section through FIG. 1 along line II—II.

The operation of this motor is best understood by considering the circuit diagram of FIG. 3 in connection with FIG. 2.

Release of the biased camera shutter takes place by depressing release rod 16. This also depresses leaf-spring 17 and the pole of switch 18 is reversed in the direction of arrow A from OFF 18a to ON 18b.

While the depression of the release rod in the camera triggers the shutter which then goes through its cycle, a kind of pre-switching takes place in housing 7: by reversing the pole of switch 18 to ON 18b, relay 19 is energized and therefore closes both its contacts 19a and 19b. Contact 19a connects motor 8 which therefore should start running but fails to because the further connection to battery 9 at 18a is still broken. The relay is self-latching by means of contact 19b, even when switch 18 is turned back from 19b to 18a: the relay remains energized.

Reversing switch 18 from ON 18b to OFF 18a occurs when the release rod 16 is let go upon the completion of the shutter cycle. The moment ON contact 18a is closed again, motor 18 runs and implements shutter winding and film transport. Bevel gears 10, 11 rotate main shaft 6 at its bottom end until the gearing unit hits its own stop. In other words, main shaft 6 and hence bevel gear 11 block bevel gear 10 with the rotor of motor 8 at the end of the winding process. Suddenly, the rotor is incapable of rotating any further, and instead, the stator is rotating in the direction of arrow B of FIG. 2, which is opposite that of the rotor's. But this stator rotation is very brief, because the stator by means of its pin 8d immediately opens switch 15. This breaks the current to relay 19. Relay 19 opens, and so do contacts 19a and 19b. Opening 19a separates the motor from the battery. It no longer develops torque and therefore the stator can be pulled back into its initial position by spring 14. The same state is obtained as when the shutter was released: the shutter is wound, the film has been moved, switch 15 is closed again, the relay contacts are open, and switch 18 is at OFF 18a. The process described may be initiated again by depressing release rod 16.

The user therefore need do no more than depress the release rod, and for every depression, he takes a picture. Winding the shutter and transporting the film, then takes place automatically by motor drive.

This operational sequence is ensured only if the user releases the release rod after the shutter has completed its cycle. As already explained above, this is automatically the case for short exposures up to those of 1/30 or 1/60 of a second because the user cannot remove his finger in less time. For longer exposures, the user must keep his finger on the release until the shutter has completed its sequence.

If however the user disregards this rule and takes off his finger from the release before the shutter has completed its cycle, the operational sequence is somewhat different:

Initially, when the release rod is depressed—as already described above—switch 18 moves from 18a to 18b and relay 19 is energized and its contacts 19a, 19b close. Obviously, the shutter is released and begins its cycle.

If now the release rod 16 is let go while the shutter is still within its cycle, motor 8 is energized and its rotor together with bevel gear 10 rotate. However, the main shaft 6 is locked during the shutter cycle. The rotor therefore cannot run forward, instead it is the stator which immediately rotates backward (see arrow's direction, B, in FIG. 2) and immediately thereby opens switch 15. Relay 19 is de-energized, and motor 8 is again separated from the battery. All of the circuit therefore returns to its initial position.

After the shutter has finally run its course, there is no further operation of any kind. The shutter remains unwound, and will not be wound. Only after the user again depresses release rod 16 and then takes his finger off does the motor 8 start running, resulting in shutter winding and film transport.

Therefore, if the user violates proper operation and takes his finger off the release prior to the termination of the shutter cycle, no greater harm occurs than his being required to press the release again in order to wind the shutter and to transport the film.

For continuous operation, provision is made for a switch 20 which in the ON position connects the motor circuit to the battery, that is, which bridges or shunts the 18/18a path. If the setting is CONTINUOUS operation—and switch 20 therefore is closed—nothing happens at first because contact 19a is still open. If however, the shutter is released and thereby switch 18 is actuated, relay 19 is energized and its contacts will close. This drives the motor and rewinds the shutter at the end of its cycle. At the end of the shutter cycle, the stator rotates backward and opens switch 15. But because the release is depressed, the shutter immediately unwinds. Contact 18b furthermore remaining closed, the relay is immediately energized again when spring 14 pulls back the stator and when switch 15 closes again. This again closes contact 19a, and the motor is again energized for relatively appreciable lengths of times, it may happen of course that the rotor will not immediately rotate forward, rather that the stator will again rotate backward and that switch 15 will be opened. This means it is possible for longer exposures that the motor will swing back and forth once or twice until the main shaft is free again for shutter rewind. But this is of no consequence for continuous operation. When the finger is taken off the camera release at the end of the contemplated series of pictures, the relay circuit is broken at 18b, and when switch 15 is opened following the last shutter rewind, relay 19 is definitely de-energized and the motor stops.

As regards the embodiment shown in FIG. 4, the user need no longer observe the above-stated operational rules. Motor 8 in this instance is provided with a ratchet coupling 40 between stator and rotor allowing both to rotate, (ie) when the rotor is stationary. But these two components are rigidly coupled when the rotor is stationary and the stator moves forward.

This leads to the following operation:

It is assumed that switch 15 is closed and the camera shutter has just completed its cycle. In such a state, main shaft 6 is not locked, but free. Therefore motor 8 may start, the rotor may move forward because the ratchet coupling 40 releases the components in this condition (rotor forward, stator stationary). Hence main shaft 6 is carried along and the shutter is rewound and the film is transported. At the end of this process, main shaft 6 is locked again and the rotor, so to speak, hits a stop. Now the stator moves backward against the force of spring 14 because the ratchet coupling also releases the components for this condition (stationary rotor, stator moving backward). The stator by means of its pin 8d in this embodiment too opens switch 15, breaking the current to the motor which will stop. But contrary to the embodiment of FIG. 1, spring 14 in the present embodiment cannot pull back the stator into its initial position because the ratchet coupling in this condition (stationary rotor, forward moving stator) acts as a clamp practically connecting rotor and stator into one solid component resting against the locked main shaft 6. Therefore switch 15 remains open and motor 8 is without power.

Only after the camera shutter has been released again and completes its cycle is the main shaft 6 released again at the end of this cycle. Then spring 14 together with the stator and rotor may pull forward in common by a slight amount, pin 8d releasing switch 15 which then closes and connects the motor to the battery. The rotor then can move forward until the shutter is rewound and the film is transported until main shaft 6 is again locked. Thereupon the stator will rotate backward and the described process starts again.

Permanent release is possible in the simplest manner, without requiring any switching, as regards this embodiment, by the user merely keeping the release depressed.

The ratchet coupling 40 is shown as a cross-section in FIG. 6, as a much simplified embodiment. This coupling consists of an outer toothed ring 40a which is rigidly connected by screws 41 to the motor housing, that is to the stator, and of an inner ring 40b solidly sitting on rotor shaft 42 and supporting a flat leaf spring 42a which so operates jointly with the teeth of ring 40a that it will slip over the teeth in the direction of the arrow when the rotor moves forward or when the stator moves backward but will engage the teeth when the rotor is stationary or when the stator is moving forward and thus will cause the rigid connection in this sense of rotation. However, the coupling shown may be replaced by any other directional lock, blocking spring etc. provided that the components ordinarily are capable of rotating independently of each other except when spring 14 tends to pull the stator forward when the rotor is stationary, thereby transforming the directional lock into a rigid unit.

The directional lock may be eliminated entirely if the electic motor is of a corresponding design and switch 15 such that it will short-circuit the motor upon actuation by pin 8d. In such a short-circuited state the rotor and stator act as one unit, so that the short-circuit prevents the stator from following the tension of spring 14. Operation remains as described above.

FIG. 7 describes schematically another embodiment which also uses no relay. Motor 70 in this case is so supported in its journal 71 by friction sufficient to retain the stator when the rotor is moving forward in the direction of the arrow, this friction however being insufficient when the stator is locked and the rotor instead is moving backward. The stator, that is the motor housing, is connected at one end with a conductor plate comprising an annular, inner continuous conducting path 72a and an outer, annular conducting path 72b. Outer conducting path 72b; however is not continuous, rather it is provided with two diametrically opposite breaks 72b' and 72b" where the conducting layer has been removed, for instance by etching.

Three wipers 73, 74, and 75 touch these conducting paths, wiper 73 resting on the inner one so as to permanently connect one motor terminal with battery 77. Wipers 74 and 75 rest on the outer conducting path and connect the other motor terminal by two parallel branches with the battery. However, wiper 74 rests on one of the segments of conducting path 72b and its branch comprises contact 76 actuated by the camera release, whereas wiper 75 rests on the non-conducting break 72b' and passes directly to the battery.

When the camera release is depressed in the direction of the arrow D of this embodiment, shutter release and hence the shutter cycle and the closing of contact 76 take place simultaneously. The latter process connects the motor to the battery and the stator ought to move forward. The main shaft however being locked during the shutter cycle, the rotor is prevented from rotating, and instead, the stator moves backward. Wiper 74 at once passes on a conducting part of conducting path 72b, so that the closure of contact 76 may be nullified again, and the motor nevertheless remains energized, the stator rotating backward. When however at the end of the shutter cycle the locking of the main shaft is eliminated, the rotor will suddenly move forward (while the stator remains stationary) and thereby rewinds the shutter and transports the film. Therefore, the main shaft and through it the rotor will be locked again at the end of the shutter rewind, whereby the stator will go on rotating backward until wiper 74 arrives at the next break 72", interrupting motor power. This process is repeated in the same manner the next time a pressure is exerted on the release.

The number of breaks in the conducting path 72b per se is variable, however there must be such adjustment between the friction of the motor housing in the bearing block and the number of breaks that even for the longest shutter time, this housing (=stator) will not move back so rapidly and so far that wiper 75 reaches the next break during the present shutter cycle—when the camera release is no longer depressed and hence contacts 76 already are open.

Furthermore, this embodiment allows permanent release without any switching in the simplest possible manner by the user permanently depressing the release.

The stator and the rotor in the above described embodiments have been considered the operational components, the motor housing being meant as the stator and the rotating motor-shaft together with its winding being meant as the rotor. This was done mainly to stress the concept of the invention as clearly as possible. In practice, however, the rotor will act directly on the main shaft of the camera only very rarely. By far in most cases a reduction gear will be inserted between the rotor and the main shaft, which latter will be connected with the output shaft of this reduction gear. In such an embodiment, that output shaft therefore should be considered that rotor which is locked primarily by the main shaft when the shutter is rewound and during the shutter cycle. It is true that the actual rotor is operationally connected with this output shaft and therefore will always be locked together with it, so that no essential operational difference results after all.

Such a difference may occur with respect to the stator if the stationary parts of the reduction gear are not rigidly connected with the stator, rather when the reduction gear is mounted in its own housing that is rotatable per se. In such a case the stator, that is the motor housing may be spatially fixed and all the operations described with respect to the backward rotating stator may be then assumed by a backward rotating gear housing. In no way would such an embodiment mean a deviation from the solution of the present invention, rather it would merely be a special embodiment.

I claim:

1. In an electric motor attachable to a photographic camera having a main shaft for shutter rewind and film transport, said motor having an output shaft acting on said main shaft of the camera and lacking any further operational connection with the camera shutter, the improvement comprising:

said electric motor (8) having a housing (7), a rotor, a stator, and a motor circuit and rotatably supported in said housing, means for rotating said stator oppositely to the direction of rotation of the rotor when said rotor is located into position at the end of the shutter rewind and film transport, and means for switching said motor circuit actuated by backward movement of said stator.

2. The electric motor of claim 1, having a battery connected to said motor circuit, wherein said means for rotating comprises said motor (8) connected on one hand by a first contact (19a) of a relay (19) and on the other hand by an OFF contact (18a) of a switch (18) with said battery, in that furthermore said relay (19) is provided with a second contact (19b) which is self-latching connected to an ON contact of switch (18), and said switch (18) is actuated by a camera release (16) and said means for switching comprises a switch (15) provided between said relay (19) and said battery (9) which is actuated by the backward rotating stator, and said stator is connected to a spring (14) pulling the stator back into its initial position after interruption of the power circuit.

3. The electric motor of claim 1, wherein a spring (14) is provided which biases said rotor into forward rotation, and in that furthermore connection means (40) are provided which cause a rigid connection between said stator and said rotor when said rotor is stationary and said stator is moving in the forward direction, so that said means for switching comprising a switch (15) for the motor power remain actuated as long as said rotor locked by said main shaft (6) from rotating forward is thus kept locked.

4. The electric motor of claim 1, wherein said means for rotating comprises means for rigidly connecting said stator and said rotor.

5. The electric motor of claim 3, wherein a switch (5) is connected to said motor circuit to short-circuit said motor when ON, and said short-circuit defines said connection.

6. The electric motor of claim 1, said motor having first and second terminals, wherein said stator is provided with first and second annular conducting paths (72a, 72b) of which said first path permanently connects said first motor terminal with said battery by means of a wiper (73), said second path (72b) being connected with said second motor terminal provided with breaks (72b', 72b") and touching two wipers leading in parallel branches to said battery (77), one of the branches comprising a contact (76) actuated by a camera release.

7. The electric motor of claim 1, further comprising a reduction gear between said electric motor and a shaft driving said camera main shaft, wherein said motor housing is mounted in stationary manner and said reduction gear is provided with a rotatably supported housing which upon locking of the shaft driving the camera main shaft rotates in a direction opposite to that of said latter shaft and thereby actuate a turn-off for said motor circuit.

* * * * *